March 3, 1953      E. E. FOSTER      2,630,316
CONSTANT COMPRESSION SPRING
Filed Sept. 1, 1950      3 Sheets-Sheet 3
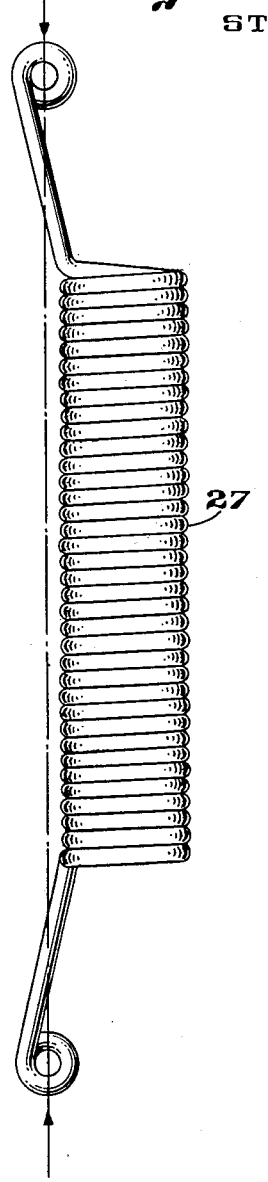
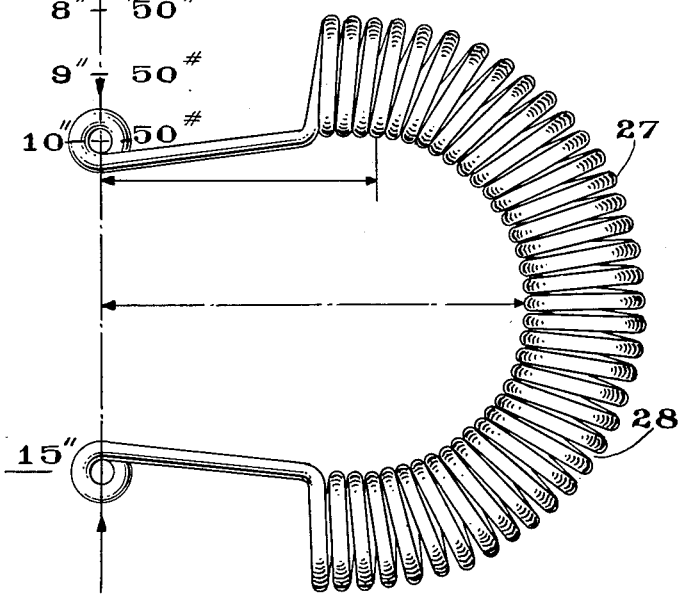
INVENTOR
Edwin E. Foster
BY Clifford C. Bradbury
ATTORNEY Patented Mar. 3, 1953

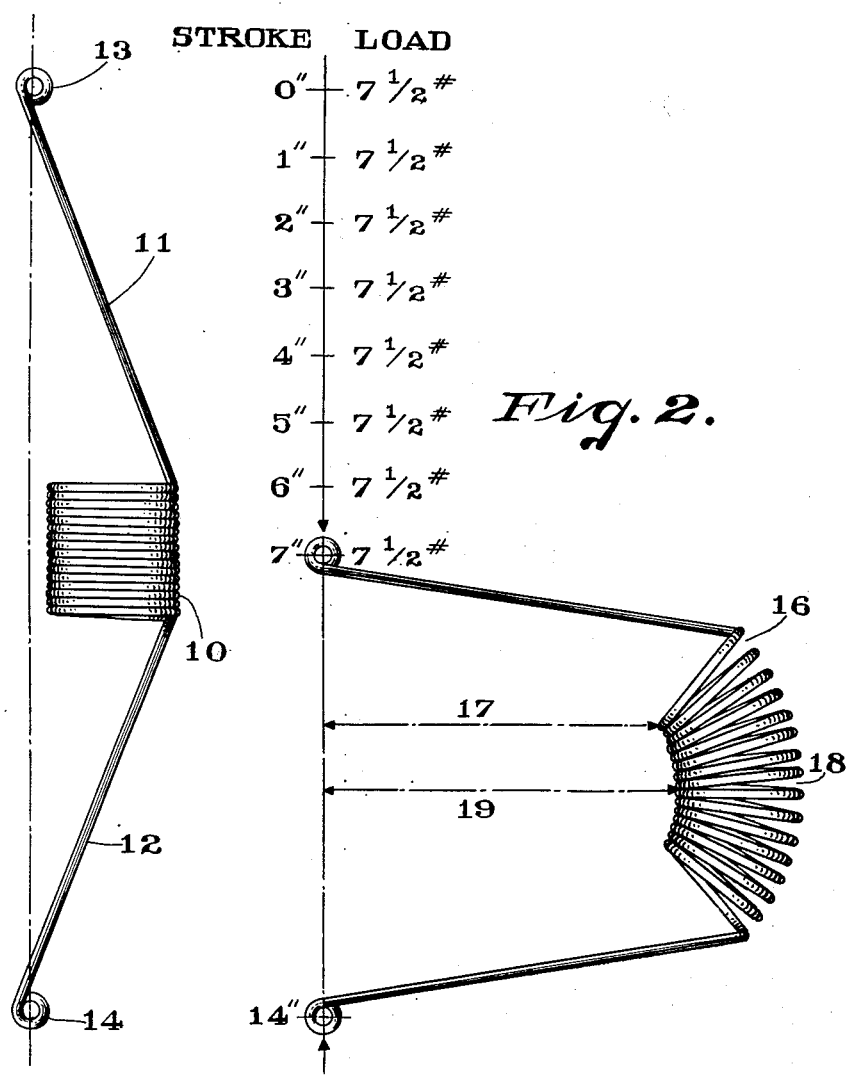

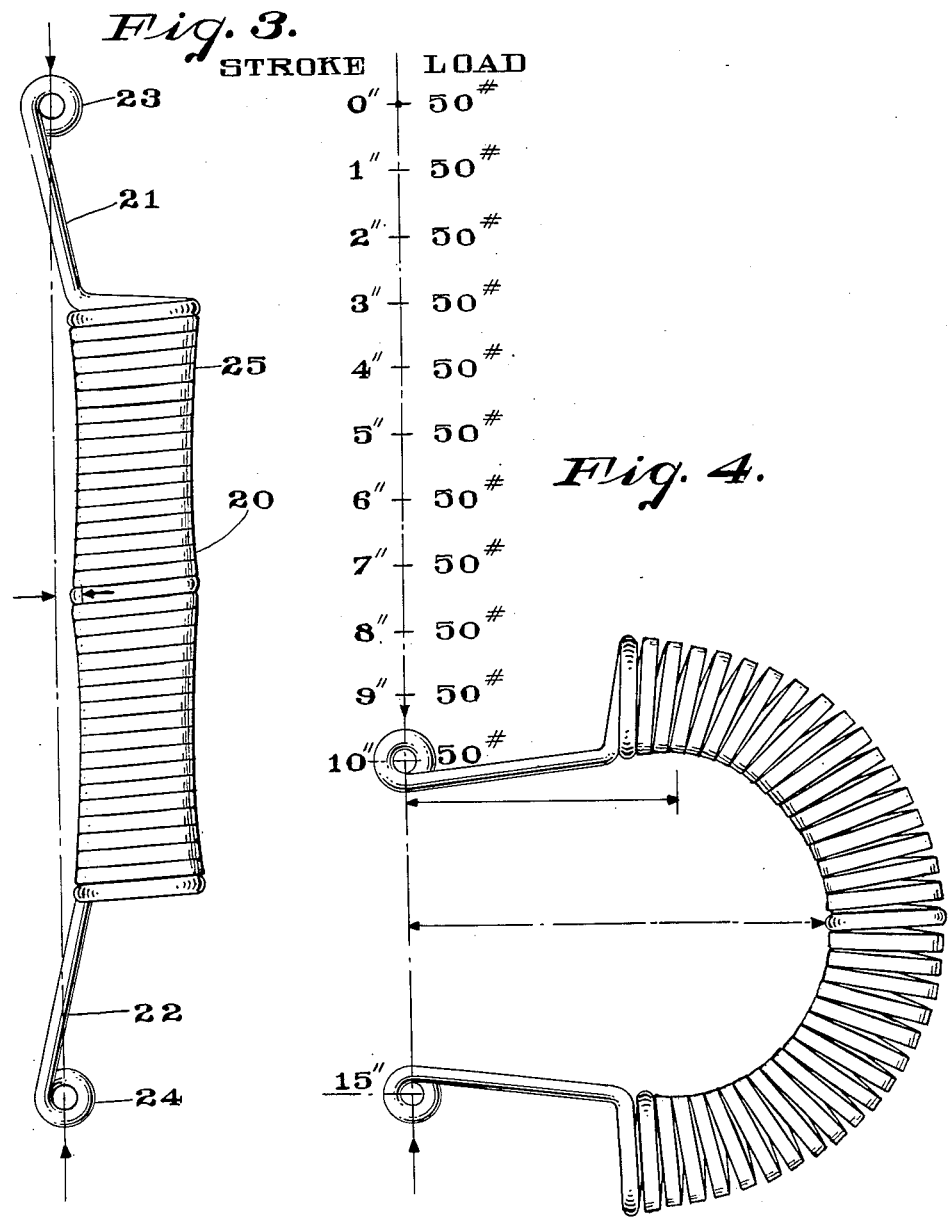

2,630,316

UNITED STATES PATENT OFFICE 2,630,316

CONSTANT COMPRESSION SPRING

Edwin E. Foster, Austin, Tex.

Application September 1, 1950, Serial No. 182,768

5 Claims. (Cl. 267—1)

My invention relates to constant compression springs; that is, springs which, through at least a portion of their possible compression, resist such compression with a constant or substantially constant force.

Ordinary compression springs increase their resistances as the degree of compression is increased. There are many devices in which it is important, or at least convenient, to have springs which apply substantially the same force or offer substantially the same resistance throughout a wide range of movement. One example where substantially constant pressure is desirable is in brush holders for electric motors and generators in which carbon brushes wear away in use, but in which the same pressure between the brushes and the commutators is desirable throughout the range of movement of the wearing brush.

My invention is a continuation in part of my applications, Serial No. 725,080, filed January 29, 1947, now Patent 2,567,931, September 18, 1951, relating to Sash Balances, and Serial No. 729,397, filed February 18, 1947, now Patent 2,520,921, September 5, 1950, relating to Hood Lifter Mechanism, in each of which applications springs are illustrated and described which offer substantially constant compression force for different degrees of spring deflections.

My invention is illustrated in the accompanying drawings in which the deflections are shown in inches and the loads are shown in pounds, and in which:

Fig. 1 illustrates a spring fourteen inches in length, formed of wire one-eighth of an inch in diameter, and having a helix consisting of sixteen turns, with straight ends six and one-half inches in length.

Fig. 2 illustrates the spring of Fig. 1 compressed through seven inches.

Fig. 3 illustrates a spring fifteen inches in length, formed of wire one-fourth of an inch in diameter, and having a helix consisting of thirty-eight turns, with straight ends three inches in length, and in which the outer portion of a part of the turns is ground to a smaller thickness.

Fig. 4 illustrates the spring of Fig. 3 compressed through ten inches.

Fig. 5 illustrates a spring of the same dimensions as the spring illustrated in Figs. 3 and 4, excepting that the external surface of the spring is not ground away. Portions of the spring between the middle and the ends are provided with less initial tension than the middle portion.

Fig. 6 illustrates the spring of Fig. 5 compressed through ten inches.

The reason for giving dimensions for the illustrations of my invention is that I have not been able to determine any formula for precalculating the dimensions of springs which will have the characteristics of the springs of my invention and, therefore, give the dimensions as an aid to those skilled in the art who may wish to practice my invention.

Referring to Fig. 1, the helical spring 10 is wound with a large amount of initial tension so that the convolutions press together with substantially all of the force that can be built into the spring. The ends of the spring 11 and 12 extend at an angle of substantially sixty degrees from the plane of the last spring coil when the spring is in its uncompressed condition. The ends of the spring ends 11 and 12 are bent into trunnion coils 13 and 14, the centers of which lie in a plane which is parallel with, but beyond the line of the outer diameter of the helical spring 10. As shown in Fig. 2, movement of the trunnions 13 and 14 toward one another, while the coils 10 are free to move laterally, results in equal resistance or load throughout a wide movement of the trunnions 13 and 14 toward one another.

The particular spring shown in Figs. 1 and 2 has a coil diameter of two inches, and a number of turns sufficient to make a compact helical spring two inches in length, when the diameter of the wire is one-eighth of an inch. In the example shown in Figs. 1 and 2, the straight spring ends are six and one-half inches in length, and the angle at which they are formed permits the centers of the trunnions to lie in a plane one-fourth of an inch away from the outside of the helix 10. With the dimensions above given, the spring carries an equal load of seven and one-half pounds throughout a compression of seven inches. In the example given, the spring is made of spring steel, and the initial tension between the coils of the spring is equal throughout the length of the spring. When the spring is compressed, one edge of the helix acts as a column or fulcrum about which the coils pivot or rock during the spring compression.

In the position of compression shown in Fig. 2, the force tending to collapse the first pair of coils 16 is equal to seven and one-half pounds, times the distance 17, divided by the diameter of the helix, and the force tending to collapse the center pair of coils is equal to seven and one-half pounds, times the distance 19, divided by the diameter of the helix, and since the distance 19 is greater than the distance 17, the force tending to collapse the coils at 18 is greater than the force tending to collapse the coils at 16. The result of this is that the coils at and near the middle of the helix are separated slightly more than those at and near the ends of the helix. So far as I have been able to determine by a great number of experiments, only helical springs which are formed with a large amount of initial tension, and which are flexed away from their axes under compression so that one side of the coil constitutes a solid column, possess the characteristics which I have discovered of constant resistance to such deflection. Springs of other sizes, but of like proportions, provide uniform resistance to load through proportionate movements.

Fig. 3 illustrates a helical spring having a coil 20, which is nine inches in length, two inches in diameter, and formed of spring wire one-fourth of an inch in diameter. The ends 21 and 22 terminate in trunnions 23 and 24, each positioned three inches away from the end coil of the spring, the trunnions being positioned in a plane one-fourth of an inch away from the nearer edge of the helix. This spring is wound with substantially equal initial tension between coils throughout the length of the spring. The external surface of the helix is ground, as shown at 25, from a location near the middle of the helix progressively deeper to the next to the last turn of each end of the helix in order progressively to decrease the initial tension between coils from the center towards the end of the helix.

A spring constructed as above described, when flexed, as shown in Fig. 4, sustains a constant load and offers a constant resistance of fifty pounds throughout a ten inch deflection. The amount by which the external diameter of the helix is progressively reduced towards the ends of the spring is just sufficient that the separation between the different coils of the spring is equal under various degrees of compression. In this instance, although the leverage tending to separate the coils of the helix is greater at the center of the spring than it is at the ends, the resistance to separation is less near the ends than at the center, so that equal separation is thus obtained.

The helical spring 27, illustrated in Figs. 5 and 6, has the same general dimensions as the spring illustrated in Figs. 3 and 4, and produces exactly the same result so far as constancy of resistance is concerned. The spring of these figures, however, is formed with varying initial tension between turns. At the middle 28 of the helix, the initial tension is the highest, and this is progressively decreased toward the ends of the helix. The amount of decrease in initial tension is just sufficient that when the spring is deflected, as shown in Fig. 6, the outer edges of the convolutions of the helix will be equally spaced. The force tending to close the convolutions at the middle of the helix is greater than the force tending to close the convolutions nearer the ends of the helix.

In all of the springs illustrated and described in this specification, the leverage acting upon the spring increases for each increase in deflection of the spring, and it is this characteristic of all of the springs which enables a selection of sizes and shapes for sustaining widely differing constant loads through very substantial movements.

While I have shown and described my invention in several different forms, I do not wish to be unduly limited thereto, since with a knowledge of the common principle involved in the operation of all of the forms illustrated and described, many variations will be possible without departing from the spirit or scope of my invention.

I claim:

1. A spring offering a constant compression resistance through a wide range of movement, formed into a helix with initial tension between adjacent coils, having its ends extended in a common plane at a substantial angle to the planes of the end helix coils and of such a length that a line between the remote ends of the spring ends lies outside the helix formed by the coils of the spring, whereby the coils of the helix are caused to separate along one edge of the helix and to be compressed together more firmly along the opposite edge of the helix when the spring ends are pressed toward one another.

2. A spring for offering a constant compression resistance through a wide range of movement, formed into a helix with initial tension between adjacent coils, the initial tension between coils in the central portion of the helix being greater than the initial tension between coils toward the ends of the helix, and having the rod of which the helix is formed extended in a common plane at both ends of the helix at a substantial angle to the planes of the end helix coils and of such length that a line between the remote ends of the rods lies outside the helix, whereby the coils of the helix are caused to separate substantially equally along one edge of the helix and to be compressed together more firmly along the opposite edge of the helix when the rod ends are pressed toward one another.

3. A spring for offering a constant compression resistance through a wide range of movement, formed into a helix with initial tension between adjacent coils, the rod of which the helix is formed having progressively decreasing thickness radially of the helix from the middle of the helix toward its ends, the ends of the rod of which the helix is formed extending angularly away from the end coils of the helix for receiving the compressive force to deflect the spring.

4. A spring for offering a constant compression resistance through a wide range of movement, formed into a helix with initial tension between adjacent coils, and having its ends extended substantially in a common plane at substantially the same angle to the planes of the end helix coils, trunnions on the ends of the spring having their axes perpendicular to the common plane of the spring ends, the centers of the trunnions being positioned in a line lying outside the helix, whereby the coils of the helix are caused to separate along one edge of the helix and to be compressed together more firmly along the opposite edge of the helix when the trunnions are pressed toward one another.

5. A constant pressure helical spring having initial tension between its turns which gradually increases from one end of the helix to the middle, and gradually decreases from the middle to the other end of the helix, a pair of lateral extensions, one on each end of the helix extending in the same plane and from the same side of the helix by which compressive force may be applied to bend the helix and separate the turns of the helix on the side opposite the extensions and press the turns of the helix more tightly together on the side toward the extensions.

EDWIN E. FOSTER.

REFERENCES CITED

The following references are of record in the file of this patent:

UNITED STATES PATENTS

| Number | Name | Date |
|---|---|---|
| 1,774,742 | Ash | Sept. 2, 1930 |
| 2,296,175 | Morkoski | Sept. 15, 1942 |
| 2,368,775 | Perret | Feb. 6, 1945 |